Dec. 10, 1968 J. L. E. BALDWIN 3,416,088

ELECTRICAL SIGNAL AMPLIFIER

Filed Oct. 27, 1964

INVENTOR

JOHN LEWIS EDWIN BALDWIN

BY Hane and Nydick

ATTORNEYS

United States Patent Office 3,416,088

Patented Dec. 10, 1968

3,416,088

ELECTRICAL SIGNAL AMPLIFIER

John Lewis Edwin Baldwin, Croydon, England, assignor to Rank-Bush Murphy Limited Filed Oct. 27, 1964, Ser. No. 406,687

Claims priority, application Great Britain, Oct. 29,1963, 42,622/63

6 Claims. (Cl. 330—3)

ABSTRACT OF THE DISCLOSURE

There is disclosed an amplifier for producing in an inductive load a current linearly related to a controlling signal applied to the amplifier, and more particularly, to an amplifier for supplying drive currents to a magnetic transducer head as used in magnetic tape recording apparatus. The amplifier comprises a push-pull output stage including thermionic tubes or transistors controlled by anti-phased control voltages. Changes in the voltage applied between a input electrode and a common electrode produce corresponding changes in current between the common electrode and an output electrode.

Figure 1:
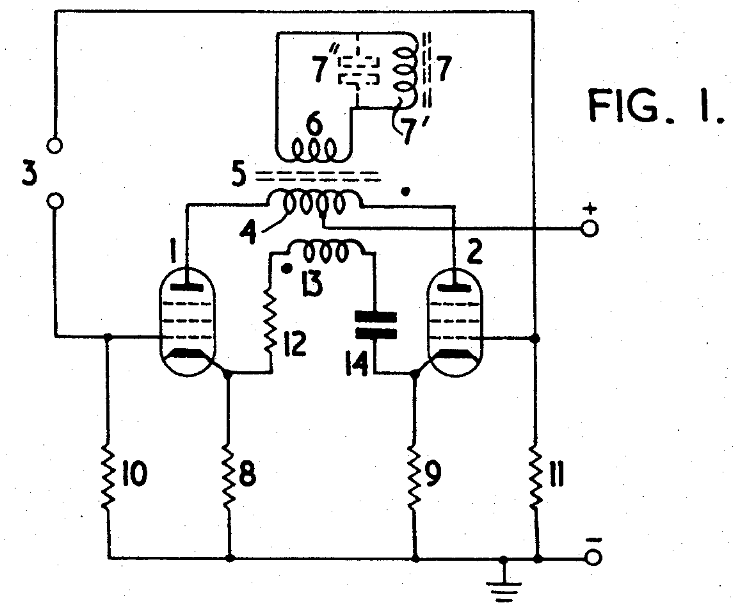

This invention relates to an amplifier for feeding a reactive load and relates in particular to an amplifier for producing in an inductive load, which may form part of a series- or parallel-resonant circuit, a current linearly related to a controlling signal voltage applied to the amplifier. An amplifier of this kind has many applications, and in particular finds use in supplying drive currents to magnetic recording heads in apparatus for recording wideband signals upon magnetic record media. More particularly, the invention relates to an amplifier having a push-pull output stage comprising two active electronic devices driven by anti-phased control voltages. The active electronic devices here employed may be thermionic tubes or transistors and are characterized in that changes in voltage applied between an input electrode and a common electrode produce corresponding changes in current between the common electrode and an output electrode.

It is an object of the present invention to provide an electrical signal amplifier suitable for driving a predominantly inductive load impedance.

It is a specific object of the invention to provide a push-pull amplifier feeding a load impedance by way of a transformer.

It is a further object of the invention to provide an amplifier advantageously applied to drive a magnetic transducer head such as is made use of in magnetic tape recording apparatus.

It is also an object of the invention to provide an amplifier of which the operation may conveniently be suppressed without disturbance of the associated circuits.

An electrical signal amplifier according to the present invention may comprise first and second like electronic amplifying devices, each having an input electrode, a common electrode and an output electrode, together with a transformer having a center-tapped primary winding, a secondary winding and a tertiary winding, and a source of direct current suitable to the operation of said amplifying devices. Signals to be amplified are fed in antiphase from a conventional source to the input electrodes of the two amplifying devices. The output electrodes of the two amplifying devices are connected directly to the ends of the center-tapped primary winding of the transformer, to the secondary winding of which a load impedance is connected. A source of direct current suitable to the nature of the amplifying devices has one pole connected to the center-tap of the primary winding of the transformer. The common electrodes of the two amplifying devices are connected by way of equal resistors to the other pole of the direct current source, and these common electrodes are in addition connected to one another by way of a negative-feedback circuit including the tertiary winding of the transformer.

It will often be advantageous for the negative feedback circuit connecting the common electrodes of the two amplifying devices to include a series capacitor to which the value is sufficiently large to ensure a minimum effect upon the A.C. operation of the circuit, while the D.C. feedback applied to the respective devices by the resistors in their common electrode leads is individual to each device. In some applications it may also be found advantageous to include in the feedback circuit an additional reactance or resistance, since such an arrangement may be used either to decrease or to increase the effective resonant frequency of the load circuit and thus to modify its frequency characteristic in a desirable manner, without altering its natural frequency of resonance.

Such a modification of the frequency characteristic of the load circuit may be especially advantageous when this load circuit forms a magnetic transducer head by means of which signals applied to the amplifier are recorded upon a magnetic record medium, for the natural resonance frequency of the transducer head is often predetermined by the physical requirements imposed upon its size and form by mechanical considerations and cannot be selected to be that which is most desirable from purely electrical considerations.

When an amplifier according to the invention is thus made use of to feed a magnetic transducer head it is sometimes advantageous to be able to suppress the operation of the amplifier, irrespective of the continued application of signals to its input.

According to one embodiment of the invention, this facility is provided by returning a common bias line for the control electrodes of the amplifying electronic devices to a direct current source having a potential which, when applied to said control electrodes allows the amplifying devices to become operative, by way of the collector-emitter path of a normally conductive transistor, and also by way of a resistor to a source of potential suck as when applied to said control electrodes to cut off the devices, and by providing means for applying to the base of this transistor, when the operation of the amplifier i required to be suppressed, a potential such as to cause th transistor to be cut off.

Figure 2:
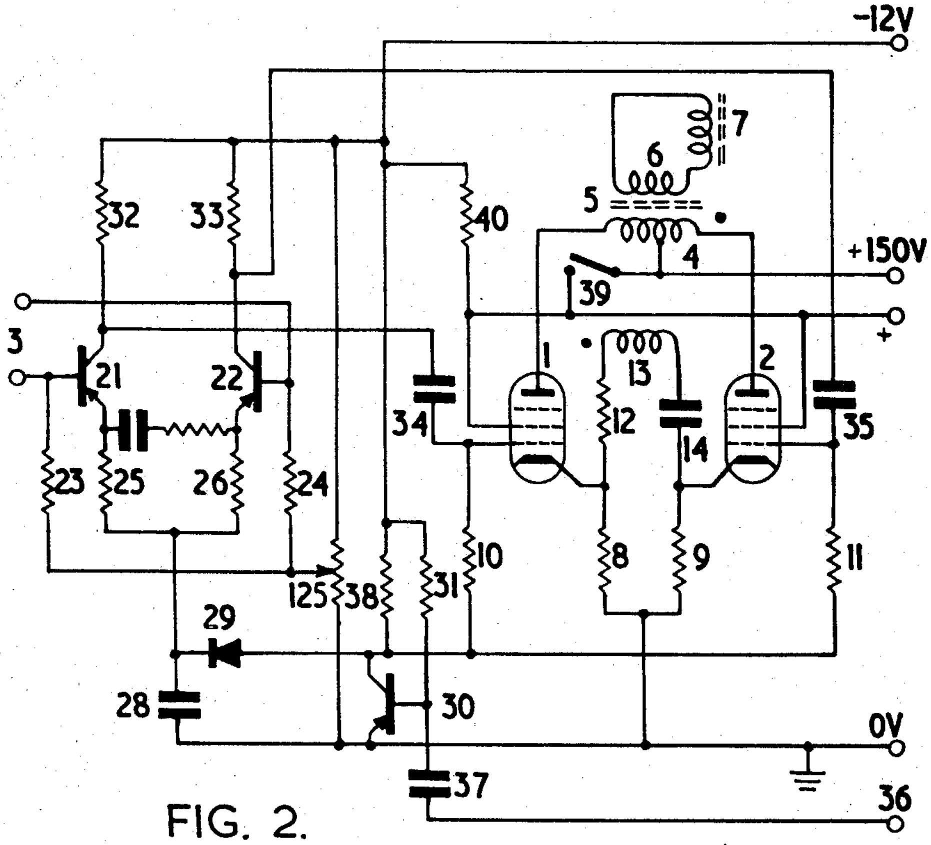

The features of the invention which are believed to b novel are recited with particularity in the appended claim The invention, together with further features and advar tages thereof, is best understood from the following de scription taken in conjunction with the accompanyin drawings, in the two figures of which like elements ar denoted by like reference numerals and in which:

FIGURE 1 is a simplified circuit diagram illustratir the principle of an amplifier according to the inventio and FIGURE 2 is a circuit diagram of a practical emboc ment of an amplifier according to the invention, inclu ing means whereby its operation may be suppressed.

The amplifier shown in FIGURE 1 comprises tv thermionic tubes 1, 2, to the grids of which antiphas control voltages are applied from terminals 3. The anoc of tubes 1, 2 are connected to opposite ends of the prima winding 4 of a transformer 5, a secondary winding 6 which is used to feed a reactive load impedance 7 incl ing an inductance. The load impedance in fact compri an inductor 7' which may in practice be a magnetic cording head shunted by a stray capacitance indica as a capacitor 7'' shown in broken line. The center- of primary winding 4 is connected to the positive minal of a source of direct current and the cathodes of tubes 1 and 2 are returned by way of respective resistors 8, 9 to the negative terminal of this source, to which also the grids of tubes 1, 2 are returned by way of respective resistors 10, 11. In accordance with the present invention a negative feedback path is provided between the cathodes of the two tubes, this path including a resistor 12, a tertiary winding 13 on transformer 5 and a D.C. isolating capacitor 14.

By thus including negative feedback in the amplifier, it becomes unnecessary to reduce the Q of the output transformer and of the resonant load by the provision of a damping resistance shunting the load, as has hitherto been necessary in order to prevent undesirable non-linearity of frequency response, which is taken in this case to be $$\frac{\text{current in inductance}}{\text{input voltage}}$$

as a function of frequency. The omission of the damping resistance in turn yields the advantage that the current supplied from the amplifier when a given excitation is to be produced in the load is substantially reduced. The inclusion of a further inductance in series in the feedback path is sometimes advantageous, for this increases the effective resonant frequency of the load circuit, while leaving the natural resonant frequency undisturbed.

FIGURE 2 shows the circuit of a practical amplifier according to the invention, including a driver stage making use of transistors. Antiphased input signals received at terminals 3 are applied to the bases of a pair of pnp transistors 21, 22. The bases of these transistors are returned through respective resistors 23, 24 to a potentiometer 125 which is connected across a 12 v. supply having its positive terminal grounded. The emitters of transistors 21, 22 are taken through respective resistors 25, 26 to a common point 27 which is bypassed to ground through a capacitor 28 and in normal operation is connected to ground by way of a forward-biased diode 29 and the collector-emitter path of a transistor 30, biased to the conductive condition by a resistor 31 through which its base is returned to the negative line.

The antiphased drive signals which appear across the respective load resistors 32, 33 of transistors 21, 22 are fed through isolating capacitors 34, 35 respectively to the grids of tubes 1 and 2, the circuit arrangements for which are generally as previously described in relation to FIGURE 1. In this case, however, the grid resistors of tubes 1 and 2 are returned to the grounded negative terminal of the 150 v. supply by way of the collector-emitter path of transistor 30. The action of this transistor in allowing the operation of the amplifier to be suppressed will now be described. When it is required to suppress the operation of the amplifier a positive-going impulse is applied by way of terminal 36 and capacitor 37 to the base of transistor 30, which is thus cut off. Since the junction of diode 29 with resistors 10 and 11 and the collector of transistor 30 is connected to the −12 v. supply by way of resistor 38, the potential of this supply is now applied to the anode of diode 29 and to the grids of tubes 1, 2. Owing to the presence of capacitors 34 and 35 the potentials of the grids of tubes 1 and 2 do not change instantly to this supply potential, but the tubes are cut off after a short interval as the capacitors charge. Both tubes are thus cut off, and the amplifier ceases to provide an output to load 7. The diode 29 is also cut off by the change of potential at its anode. The driving transisors 21 and 22 are now more gradually cut off since the emitter current of the transistors now charges capacitor 28 until a condition is reached in which the transistors are cut off. In this way drive to the tubes 1 and 2 is maintained until they are cut off, this prevents permanent magnetization of the transducer head. On the other hand since the drive transistors 21 and 22 are eventually cut off the production of signal on the output due to stray coupling is reduced.

An alternative method of suppressing the amplifier operation is provided by a switch 39 which, when opened, disconnects the screen grids of tubes 1 and 2 from the +150 v. supply and leaves them connected to the −12 v. supply by way of a resistor 40. Current in tubes 1 and 2 is thus suppressed.

While particular embodiments of the invention have been shown and described, it is apparent that changes and modifications may be made without departing from the invention it its broader aspects. The aim of the appended claims, therefore, is to cover all such changes and modifications as fall within the true spirit and scope of the invention.

I claim:

1. An electrical signal amplifier comprising, in combination: first and second electronic amplifying devices, each of said devices having an input electrode, an output electrode and a common electrode; a transformer having a center-tapped primary winding, a secondary winding and a tertiary winding; a source of antiphased signals to be amplified; circuit means connecting said antiphased signals respectively to the input electrode of an individual one of said amplifying devices; direct connections from said output electrodes of said amplifying devices to respective ends of said primary winding; a source of direct current having first and second poles; a connection from said first pole to said center-tap of said primary winding; an individual resistor connected between said common electrode of each said amplifying device and said second pole of said source; a load impedance; connections from said secondary winding to said load impedance; and a negative-feedback circuit including said tertiary winding connected between said common electrodes.

2. An electrical signal amplifier in accordance with claim 1; in which said negative feedback circuit comprises the series combination of said tertiary winding and a capacitor.

3. An electrical signal amplifier in accordance with claim 1, in which said negative feedback circuit comprises the series combination of said tertiary winding, a resistor and a capacitor.

4. An electrical signal amplifier in accordance with claim 1, in which said load impedance comprises a magnetic recording head.

5. An electrical signal amplifier comprising, in combination: first and second like electronic amplifying devices, each said device having an input electrode, an output electrode and a common electrode; a transformer having a center-tapped primary winding, a secondary winding and a tertiary winding, a souce of antiphased signals to be amplified; circuit means connecting said antiphased signals to respective input electrodes of said amplifying devices; direct connections from said output electrodes of said amplifying devices to respective ends of said primary winding; a source of direct current having first and second poles; a connection from said first pole to said center-tap of said primary winding; individual resistors connecting said common electrodes of said amplifying devices to said second pole of said source; a load impedance; connections from said secondary winding to said load impedance; a negative-feedback circuit including said tertiary winding connected between said common electrodes; a first potential source (0V); a transistor (30) having a base electrode, a collector electrode and an emitter electrode; individual resistors (10, 11) connecting said input electrodes of said amplifying devices to said collector electrode of said transistor; a further resistor (38) connecting said collector electrode to said second bias source; a connection from said emitter electrode of said transistor to said first bias source; a source (36) of control signals; and circuit means (37) applying said control signals to said base electrode of said transistor to thereby cause said transistor to become alternately conductive and cut off, whereby when said transistor is conductive said control electrodes are held at said first potential thereby to render said amplifying devices operative and when said transistor is cut off said control electrodes are held on said second potential thereby to render said amplifying devices inoperative.

6. An electrical signal amplifier in accordance with claim 5 in which said active electronic devices are vacuum tubes having screen grids, and including also a resistor (40) connecting said screen grids to said second potential source; a source of operating potential (+150) for said screen grids; and a switch (39) which when closed connects said screen grids to said source of operating potential to render said amplifier operative and when opened allows said screen grids to acquire the potential of said bias line, thus causing said amplifier to become inoperative.

References Cited

UNITED STATES PATENTS

| | | | |
|---|---|---|---|
| 2,429,124 | 10/1957 | Cunningham | 330—81 |
| 2,595,444 | 5/1952 | Becker | 330—81 |
| 2,452,499 | 10/1948 | Siezen | 330—94 X |

NATHAN KAUFMAN, *Primary Examiner.*

U.S. Cl. X.R.

330—77, 79, 81, 69, 195, 30